US009644594B2

(12) United States Patent
Betscher et al.

(10) Patent No.: US 9,644,594 B2
(45) Date of Patent: May 9, 2017

(54) SWITCH ARRANGEMENT IN A MOTOR VEHICLE ELECTRICAL SYSTEM

(71) Applicant: Auto-Kabel Management GmbH, Hausen i.W. (DE)

(72) Inventors: Simon Betscher, Grevenbroich (DE); Wacim Tazarine, Mönchengladbach (DE); Frank Gronwald, Bedburg (DE)

(73) Assignee: Auto-Kabel Management GmbH, Hausen i. W. (DE)

( * ) Notice: Subject to any disclaimer, the term of this patent is extended or adjusted under 35 U.S.C. 154(b) by 0 days.

(21) Appl. No.: 14/905,100

(22) PCT Filed: Apr. 30, 2014

(86) PCT No.: PCT/EP2014/058813
§ 371 (c)(1),
(2) Date: Jan. 14, 2016

(87) PCT Pub. No.: WO2015/007410
PCT Pub. Date: Jan. 22, 2015

(65) Prior Publication Data
US 2016/0160828 A1   Jun. 9, 2016

(30) Foreign Application Priority Data

Jul. 15, 2013 (DE) .......................... 10 2013 011 720
Aug. 13, 2013 (DE) .......................... 10 2013 013 371

(51) Int. Cl.
*B60R 16/03* (2006.01)
*F02N 11/08* (2006.01)

(52) U.S. Cl.
CPC ............ *F02N 11/087* (2013.01); *B60R 16/03* (2013.01); *F02N 11/0862* (2013.01);
(Continued)

(58) Field of Classification Search
CPC .. F02N 2300/106; F02N 11/087; F02N 11/14; F02N 11/08; F02N 2011/0877
(Continued)

(56) References Cited

U.S. PATENT DOCUMENTS 5,175,484 A    12/1992  Witehira et al. ................. 320/6
6,229,279 B1 *  5/2001  Dierker ................ H02J 7/0013
                                                          307/10.1
(Continued)

FOREIGN PATENT DOCUMENTS

CN    104662285 A    5/2016    ............. F02N 11/08
DE    39 30 153 A1   3/1991    ............. B60R 16/02
(Continued)

OTHER PUBLICATIONS

International Searching Authority, International Search Report—International Application No. PCT/EP2014/058813, dated Jul. 28, 2014, together with the Written Opinion of the International Searching Authority, 11 pages.
(Continued)

*Primary Examiner* — Rexford Barnie
*Assistant Examiner* — Thai Tran
(74) *Attorney, Agent, or Firm* — Sunstein Kann Murphy & Timbers LLP (57) ABSTRACT

Switch system for a motor vehicle electrical system comprising a first switch element arranged between a generator-battery line and a starter-battery line of a vehicle electrical system, such that the generator-battery line and the starter-batter line can be short circuited spatially in the region of the starter.

26 Claims, 3 Drawing Sheets

(52) U.S. Cl.
CPC ... *F02N 11/0866* (2013.01); *F02N 2011/0874* (2013.01); *F02N 2011/0877* (2013.01); *F02N 2011/0885* (2013.01); *F02N 2250/02* (2013.01)

(58) Field of Classification Search
USPC .......................................................... 307/10.6
See application file for complete search history.

(56) References Cited

U.S. PATENT DOCUMENTS

| | | | |
|---|---|---|---|
| 6,731,021 B1 | 5/2004 | Urlass | 307/10.1 |
| 7,501,790 B2 | 3/2009 | Fuhr et al. | 320/104 |
| 2002/0031700 A1* | 3/2002 | Wruck | H01M 2/28 |
| | | | 429/61 |
| 2014/0035292 A1* | 2/2014 | Gronwald | B60R 16/03 |
| | | | 290/38 R |
| 2015/0224948 A1* | 8/2015 | Schoeberl | F02N 11/0862 |
| | | | 307/10.6 |

FOREIGN PATENT DOCUMENTS

| | | | |
|---|---|---|---|
| DE | 199 53 534 A1 | 5/2001 | B60F 16/04 |
| DE | 199 57 478 A1 | 5/2001 | B60R 16/04 |
| DE | 100 14 243 A1 | 10/2001 | B60R 16/04 |
| DE | 102 10 537 A1 | 9/2003 | F02N 11/08 |
| DE | 10 2008 032 138 A1 | 1/2010 | B60R 16/03 |
| EP | 0 987 146 A2 | 3/2000 | B60R 16/02 |
| EP | 1 677 327 A1 | 7/2006 | H01H 51/06 |
| JP | H09-140070 A | 5/1997 | H02J 7/14 |
| WO | WO 2014/064148 A1 | 5/2014 | F02N 11/08 |

OTHER PUBLICATIONS

State Intellectual Property Office of P.R.C., Notification of the First Office Action—Application No. 201480040448.4, dated Sep. 18, 2016, 7 pages. (English translation).

* cited by examiner

SWITCH ARRANGEMENT IN A MOTOR VEHICLE ELECTRICAL SYSTEM

The subject matter relates to a switch system for motor vehicles as well as a method to control such a switch system.

Combustion engines in motor vehicles offer no torque during standstill. For this reason, until the present day, such combustion engines cannot be started autonomously by injection of fuel. This causes the combustion motor or combustion engine to have to be loaded with torque within the vehicle in order to start. This torque is provided, as a rule, using a starter or an electrical machine. Such an electrical machine is necessary to start the combustion engine.

The starter of the combustion engine is fed by the battery of the motor vehicle. At the moment of starting, i.e. to initiate the starter, the inductive load thereof is low-resistance and a very high current flows from the battery via the starter. The inductance of the starter almost represents a short circuit at the moment of starting. The high current flow caused by this leads to drops in the battery voltage at the battery terminals. In the case of a typical start procedure of a vehicle, the battery voltage drops below a limit value after a short time. As a consequence, therefore it can occur that other loads in the electrical system of the vehicle which require a minimum voltage can no longer be supplied with sufficient electrical energy.

The voltage drop occurs in all vehicles with a combustion engine during the start procedure if the combustion engine is started by means of a starter. Vehicles can be, for example, automobiles, rail vehicles or air vehicles. Furthermore, ships are also vehicles in the sense of the subject matter.

In order to prevent this voltage drop during the start procedure, in particular in the start-stop operation, as has become usual today for fuel saving, a plurality of voltage stabilization concepts exist, such as, for example, the use of back-up capacitors, the use of additional batteries and the use of start current limiting systems.

A start voltage or start current limiting system is also known as a start voltage drop limiter, start current limiter (SCL), start current control (SCC), voltage drop limiter (VDL) or similar. Such a start current limiting system limits the start voltage drop by reducing the current which flows from the battery to the starter. Furthermore, voltage drops are therein conceded up to a defined lower limit. Furthermore a start time delay is conceded as the starter does not receive the complete available electrical energy of the battery in the start procedure, but only a limited amount.

During the start procedure with a conventional battery, the battery voltage drops below 8 volts after a few milliseconds. This initial voltage drop acts on all electrical components connected to the battery. The initial voltage drop which occurs only in the short term, could, for example, be compensated for by upstream buffer capacitors. During a conventional start procedure, the voltage of the battery recovers in the short term to over 9 volts directly after the start, in order to then, however, drop below 9 volts again. This second voltage drop cannot be intercepted by conventional buffer capacitors, as the capacitance thereof is only sufficient to compensate for the first voltage drop. The buffer capacitors are regularly discharged after the first voltage drop and the second voltage drop during a start procedure leads to problems within the electrical system. In particular, engine control devices and airbag control devices as well as other control devices can malfunction in the short term, as not every control device is designed for such a low voltage level of below 9 volts.

Start current limiting systems are arranged as a rule between the battery and the starter. Conventional electrical system topologies contain a battery, a starter, a generator and at least one load network. Depending on the concept, the starter and the generator are each supplied using a separate line. This leads, however, to an increased cable weight, as two lines are led from the battery to the starter or generator, although as a rule the starter and generator are arranged in spatial proximity to each other, in particular in the engine compartment.

For this reason, the object of the subject matter is to provide an efficient switch system which can be inserted particularly simply into the electrical system typology and at the same time provides a weight saving.

This object is achieved by a switch system according to claim 1.

It has been found that the line topology in motor vehicles can be used in an advantageous manner relating to the generator-battery line or the starter-battery line in order to be able to achieve a start current switch-on limiting. As a rule, the starter and the generator are arranged in the engine compartment. They are in spatial proximity to each other. The battery is either arranged in the engine compartment, or in the boot compartment or underbody of a vehicle, and therefore further removed spatially from the starter or generator, than these are from themselves. In that both the starter-battery line and the generator-battery line must be led from the battery to the starter or generator, a doubled cabling effort results. This doubled cabling effort can be used according to the subject-matter to vary a line resistance between the starter and the battery or the generator and the battery. This is achieved by the starter-battery line and the generator-battery line being able to be short circuited spatially in the region of the starter. Due to the short circuiting of the two lines, the entire line cross-section is enlarged between the point of the short circuit and the battery, in particular almost doubled. This can be useful for a wide variety of purposes.

During normal operation of the vehicle, the battery is charged via the generator. A charging current usually flows from the generator to the battery via the generator-battery line. If the first switch element is short circuited, the charging current can additionally flow via the starter-battery line to the battery and the lines are less heavily stressed. A lower heat development occurs in the two lines. The power loss is thereby likewise reduced.

Additionally it is possible that, at the moment of starting, in particular at the moment of warm starting, initially only the starter-battery line is used. This line has a first line resistance. Due to the line resistance, the current which flows from the battery to the starter in the case of starting is limited. Shortly after starting, for example after a few milliseconds, in particular less than 100 milliseconds, the first switch element can be closed. The starter current can then flow both via the starter-battery line and the generator-battery line. The entire line resistance is reduced due to the parallel connection of the two lines. The starter current is now increased as a lower line resistance is present between the battery and the starter. This can be dimensioned such that a sufficiently high starter current can flow.

As already explained, both the starter and the generator are preferably arranged in the engine compartment of a vehicle. The first switch element is therefore likewise arranged, according to an advantageous embodiment, in the engine compartment of the vehicle. This means that the first switch element is arranged in spatial proximity to the generator as well as to the starter. In particular, a spatial proximity to the starter is advantageous.

An optimised start current switch-on limiting is then possible if the first switch element according to one exemplary embodiment is arranged at a cross-sectional tapering of the starter-battery line. The starter-battery line can be formed from at least two line cross-sections. In particular, the line cross-section can be lower between the connection of the first switch element and the battery or an output of the switch network than the line cross-section between the connection of the first switch element and the starter. At the moment of starting, as explained above, in the case of corresponding control of the first switch element, the starter current initially flows only via the starter-battery line. Due to the reduced conductor cross-section in the region of the starter-battery line, the total current is limited as the line resistance is increased. Additionally, the second switch element is closed during starting and the third switch element can additionally also be closed.

This limiting can be dimensioned such that the battery voltage does not fall below a level of, for example, 9 volts. The lower level of the battery voltage is dependent on the control devices and loads within the electrical system topology. The start current switch-on limiting can be dimensioned depending on for which lower voltage limits the control devices or components are designed. This can be a lower voltage limit of 9 volts, however can also amount to other values in other electrical systems which are not based on a 12 volt battery.

Due to the closing of the first switch element, the region of the cross-sectional tapering of the starter-battery line is short circuited via the generator-battery line and the battery current can flow from the battery to the starter via both lines.

The cross-sectional tapering is, according to one embodiment, such that the line has a greater cross-section between the first switch element and the starter than the line between the first switch element and the battery or an output of the switch network. In particular, the first switch element is arranged electrically directly in the region of the cross-sectional tapering. The cross-sectional tapering can, for example, be provided in the region of a bonding of two subconductors, wherein the starter-battery line is formed from at least these two subconductors. In particular, the first switch element can be attached to a tapping which is arranged on the starter-battery line. It is also possible, as already described above, to not implement a starter-battery line with cross-sectional tapering. The voltage drop limiting thereby is abandoned, but the first switch element maintains its function.

According to one exemplary embodiment, the cross-sectional tapering is at least a halving of the conductor cross-section. It is also possible that the conductor cross-section is reduced substantially by approx. one quarter to one third. In particular, a cross-sectional tapering from 85 mm$^2$ to 25 mm$^2$ is possible. Other values are, however, also useful and possible.

The starter current flows, after closing the first switch element, both via the starter-battery line and via the generator-battery line. This current must also be able to be carried by the part of the starter-battery line, which lies between the first switch element and the starter. Therefore, the line resistance in this subregion of the starter-battery line must be selected to be as low as possible, so the line cross-section to be as great as possible, if necessary. Furthermore, the ampacity of this subregion is designed to be higher than the ampacity of the first subregion of the starter-battery line. In order to keep the line resistance as low as possible, it is proposed that the first switch element is connected to the starter-battery line in such a way that the line length between the first switch element and the starter is smaller than between the first switch element and the battery or an output of the switch network.

During operation, generator current flows from the generator to the battery. The line losses must be as low as possible. This means that line cross-sections are selected to be as large as possible. In order to ensure this, the first switch element is closed during operation such that the generator current can flow from the connection point of the switch element via both the starter-battery line and the generator-battery line to the battery.

In order to keep the line losses as low as possible in the first subconductor of the generator-battery line, it is proposed that the first switch element is connected to the generator-battery line in such a way that the line length between the first switch element and the generator is lower than between the first switch element and the battery.

The battery can be formed with one of its terminals at a parallel connection from the first switch element and a switch network. The switch network can be connected at an input to the battery terminal, in particular the battery positive terminal. On the output side, the switch network can be connected on the one side to a first output with the generator-battery line and to a second output with the starter-battery line. One switch element can be provided in the switch network in order to be able to connect the battery or the battery terminal to the generator-battery line or the starter-battery line respectively.

As already explained, the switch network has an input. The battery terminal can be connected to this input, which can also be formed from two tappings which are short-circuited with each other. In the switch network, a second switch element can be arranged in the starter-battery line and a third switch element in the generator-battery line.

The switch elements enable the respective line to separate from the battery. In particular during vehicle standstill, it is possible to separate the battery terminal from the electrical system in the region of the starter-battery line or generator-battery line.

Each of the switch elements has an, albeit low transition resistance and represents an ohmic resistance in the connection between the battery and the generator or starter. In order to keep the power loss in the switch network low, it is preferred if the switch elements have a resistance of less than 10 mOhm, preferably less than 1 mOhm, particularly preferably less than 0.1 mOhm. Furthermore, the connections and lines of the switch network are preferably designed such that a resistance of less than 10 mOhm, preferably less than 1 mOhm, particularly preferably less than 0.1 mOhm is present between the input and each output of the switch network.

Due to a suitable circuitry of the switch elements it is possible, on the one hand to ensure a current disconnection of the battery lines (starter-battery/generator-battery line) in the event of a crash. On the other hand, the starter-battery line can be used to charge the battery, among other things through the first switch element. Additionally, a start current switch-on limiting could be achieved via a starter-battery line with cross-sectional tapering at least in parts.

The switch system can be used not only in automobiles, such as cars and lorries, having combustion engines, but also in rail vehicles, air vehicles, ships or similar, whether purely electrically operated or used with a combustion engine.

The switch network is preferably arranged in proximity to the electrical battery, in particular the vehicle battery, in particular the starter battery of the motor vehicle. It is, as a rule, a 12, 24 or 48 volt battery.

In order to keep the electrical power loss between the switch network and the battery terminal as low as possible, it is proposed that the input can be short circuited substantially with a battery positive terminal. In the case that the switch network is connected to the battery positive terminal, it is possible to disconnect the current in the battery lines to the generator as well as to the starter by means of the switch network. Preferably, a coupling of the switch network to the battery positive terminal that is as close as possible is strived for in order to prevent a short circuit with the body or the battery negative terminal being able to result in the electrical line between the switch network and the battery positive terminal. Leakage currents and power loss can be inhibited by the disconnection of the current during vehicle standstill. In particular, components which are arranged in the branch of the generator-battery line can likewise be disconnected from current.

A particularly simple installation in a motor vehicle system can then be achieved if the switch network is encapsulated in a housing. The switch elements are provided in the housing and preferably only the two outputs as well as the input project from the housing as electrical contact elements. It is also possible that a signal line leads into the housing or that signal connections are present on the housing projecting outwards.

In order to be able to ensure the various functionalities, it is possible that the individual switch elements are able to be controlled separately. Preferably, each individual switch element is able to be controlled separately. By controlling the first switch element, it is possible to short circuit the two lines with each other in the region of the first switch element or the connection line between the generator-battery line and the starter-battery conductor.

It is possible via the third switch element to short circuit the first output with the input. It is therefore, for example, possible to short circuit the battery terminal with the generator-battery line. In particular, the battery positive terminal. The second switch element enables a short circuiting between the input and the second output. It is, for example, therefore possible to short circuit the battery terminal with the starter-battery line.

The opening and closing of the switch elements occurs via a corresponding control impulse from a control device. The control device is preferably arranged outside of the housing. It is also possible that the control device is part of the switch network. As such the control device can be arranged in the housing. The control device can be formed as a part of the switch element. The control device can be arranged in a switch element which functions as a so-called "master". Then, the respective other switch elements can function as so-called "slaves" of this "master".

In order to enable the switching from outside of the housing, it is proposed that a preferably multi-wired control line is guided into the housing to switch the switch elements. Thus control impulses can be generated from outside which are used within the housing to switch the switch elements. This has a flexibility which is as great as possible with regard to the arrangement of the control device and enables a miniaturisation of the housing itself.

The housing of the switch network can be arranged in a pole niche of a vehicle battery, on the one hand to save space and on the other hand to be electrically favourable. The input is then directly on the battery terminal, preferably the battery positive terminal. It is possible that the housing is formed as a part of the battery terminal clip. On the other hand, the pole niche is already present and the arrangement of the housing in the pole niche leads to a minimum space consumption. The vehicle topology then does not have to be changed.

A battery is regularly provided with a standardised pole niche. In particular DIN standards DIN EN 50342-2 as well as DIN 72311 specify standardised dimensions for the pole niches as well as a housing offset of the battery which runs between the poles. The pole niche is therein the region which has the battery terminal and is limited by the side walls of the battery on the one side and the outer edges of the battery on the other side. Preferably, the pole niche has maximum dimensions of 60 mm by 72.5 mm. The height of the pole niche is regularly between 30 and 40 mm, preferably below 35 mm. The switch network can be arranged within this construction space, preferably by using the longitudinal offset which runs between the pole niches. It is understood that the spatial arrangement of the switch network within the pole niche can be understood such that it is herein meant that the assemblies are arranged for the most part therein. Should the assemblies lie partially outside of the pole niche, however furthermore for the most part within the pole niche, then this is included by the meaning of the term spatially within the pole niche.

The switch elements can be formed from parallel connections of individual switches which can in turn have individual switches and can be connected in parallel. It is also possible that antiserial switches, for example in the form of transistors connected to work in opposite directions, are provided in the switch elements. Therefore, the switch elements can connect current unidirectionally as well as bidirectionally. Preferably, diodes can also be provided in the switch elements in order to enable the current flow direction, for example, in only one direction. For example, such diodes can be at least the respective intrinsic diodes (body diodes) which are already present in the semi-conductors. Additionally, a freewheeling diode can be used preferably as a new, further component to discharge the semi-conductor.

According to one exemplary embodiment it is proposed that a switch element has at least one electronic switch. An electronic switch can be formed, for example, as a semiconductor switch. This can, for example, be a transistor switch, a MOSFET switch, an IGBT switch or similar.

Electrical switches, such as for example contactors or relays, can also be provided.

The switch elements can be formed from a parallel connection of at least one diode and one switch respectively. Preferably the second and third switch elements have at least one diode respectively, the passage direction of which points in the direction of the battery. The first switch element can have a parallel connection of at least one diode and one switch. The passage direction of this diode can point from the starter-battery line or the second output in the direction of the generator-battery line or the first output.

Due to this diode of the first switch, it can be prevented that the flow from the generator-battery line to the starter-battery line and/or to the starter flows whilst the first switch is open.

As indicated previously, the switch elements can be formed from a plurality of switches. Therefore it is also proposed that a switch element is formed from a parallel connection of at least two switches which are able to be switched separately. In particular, a high ampacity and/or a low transition resistance is necessary in order to operate a starter-battery line or a generator-battery line usefully. In the case of starting a combustion engine, as a rule a current of some 100 amperes flows from the battery. Semi-conductor switches must be designed for such high currents and the power loss via these switches should be as low as possible. It can be more favourable to connect several semi-conductors in parallel in order to in total provide the desired transition resistance through the parallel connection of the individual semi-conductor switches. The malfunction of an individual semi-conductor switch can, if necessary, be compensated for by a parallel connection of several semi-conductor switches. Additionally, the transition resistance of the switch element can be varied by cascaded switching of semi-conductor switches within a switch element, which can be relevant in particular for start current switch-on limiting. Therefore, for example, at the beginning only a few semi-conductor switches can be closed within a switch element and little by little, semi-conductor switches are switched on.

Therein, in particular it is possible at the moment of a prestart phase, so before the starter is applied with current at all, to charge the buffer capacitor which is connected regularly to the generator-battery line. For this purpose, for example, during the prestart, the third switch element can be closed or the second and first switch elements can be closed in order to charge the capacitor. In order to obtain a charging current which is as even as possible, the third or the second or the first switching element can also be closed and opened in a pulsed manner. Therefore, the charging current can be influenced and the capacitor can be charged as gently as possible. After the prestart, the start current for the starter can be switched by initially closing the second switch element, if necessary also in a pulsed manner. In a second start phase, the first switch element can be closed in order to reduce the line resistance between the battery and starter.

It is also possible to make the current switchable in a pulsed manner between the battery, starter and components. Due to a pulsed switching of the switch elements, an average resistance value can be adjusted which can also be relevant for current switch-on limiting.

The switch system can have a generator-battery line and a starter-battery line. The battery terminal is connected to the input of the switch network via the battery line. The first output of the switch network is connected to the generator-battery line and the second output of the switch network to the first part of the starter-battery line. The first switch element is arranged in the region of the starter and of the generator, in particular in the engine compartment, for example in the battery tray or in a bias current distributor. The first switch element connects the starter-battery line to the generator-battery line, preferably using at least one generator-starter connection line, in particular by direct contacting of the first switch element to the starter-battery line and the generator-battery line. The first switch element is connected in the region of the cross-sectional change of the starter-battery line, said first switch element being connected to the generator-battery line. The system provides a switch functionality between the battery and the starter or the generator.

In the system according to the subject-matter, the switch network is preferably arranged in spatial proximity to the battery, in particular at a distance of less than 50 cm. For a particularly low power loss in the battery line, a line length is proposed between a battery terminal and the input of less than 50 cm. Furthermore, the short circuit susceptibility for the line stretch between the battery terminal and the input must be kept as low as possible, which is also able to be achieved, among other things, by a low line length.

A preferred position of the arrangement of the switch network is a battery tray or a current distributor. Therein the switch network can be arranged in direct proximity to the battery.

As has been described previously, a control switch can be provided in the system. This is established to switch the individual switch elements depending on vehicle states. Thus a current switch off of the starter-battery line and/or the generator-battery line can occur. Thus, for example, leakage current corrosion can be reduced or prevented by these lines being separated from the battery positive terminal during standstill of the vehicle. Furthermore, due to necessary parallel connection of parts of the starter-battery line to parts of the generator-battery line, the line resistance between the starter or the generator and the battery can be varied.

For example, it is possible that at least the second switch, preferably the second switch and the third switch are opened during vehicle standstill.

During starting, in particular during warm starting in a start-stop operation, it is frequently necessary to prevent a voltage drop below 9 volts. In order to achieve this, the current must be controlled from the battery to the starter. In the first hundred milliseconds, preferably in the first second, in particular within the first two seconds of starting, a very high current flows from the battery to the starter. In order to reduce this, it is proposed to close at least only the second switch element at the beginning of the start procedure. It is also possible that the second and the third switch elements are closed at the beginning of starting. Only after expiry of a certain start time can the first switch element be switched on. It is also possible that the first, second and third switch elements are closed at the beginning of starting.

The opening and closing of the switch elements can also occur depending on a state of charge of the battery (SOC) or a state of health of the battery. Therefore, for example in the case of a low battery voltage, i.e. a poor SOC, a voltage drop can be taken into account by pulsed switching of the second switch element. The first switch element, if necessary, can also be switched on only later or also in a pulsed manner in order to charge the battery as gently as possible.

The state of the switch elements can also be monitored by the control circuit. In the case of a malfunction of a switch, in particular of the second or third switch, the malfunctioning switch can be bridged by closing the respective other switch and the first switch and therefore an error function can be prevented.

A first part of electrical components of the motor vehicle can be arranged in the generator-battery line or in the leg which connects the generator-battery line to the switch network.

A second part of electrical components can be connected directly to the battery positive terminal without having to be secured via the switch network. These components can, for example, be components which are critical to safety and in the case of which a disconnection must necessarily be prevented.

A further object is a method according to claim 26. The switching of the switch elements depending on the vehicle states enables an adaptive control of the resistance between the battery and the starter or the battery and the generator and therefore an influence on the current in the generator-battery line as well as on the starter-battery line.

Below, the subject matter is explained in more detail by means of drawings showing an exemplary embodiment. In the drawings shown.

Figure 1:
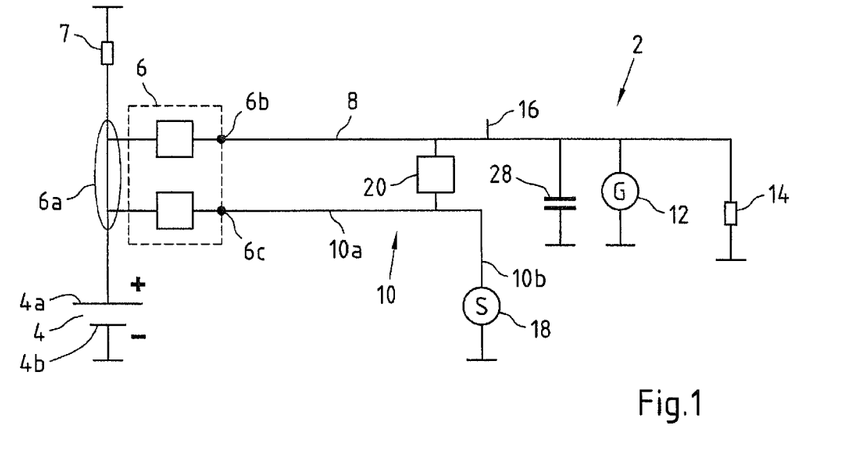
FIG. 1 a general electrical system topology having a switch network.

FIG. 1 shows an electrical system topology 2 of a motor vehicle. The electrical system topology has a motor vehicle battery 4 having a positive terminal 4a and a negative terminal 4b. The negative terminal 4b is regularly connected to the body of the motor vehicle. A switch network 6 is arranged in direct spatial as well as electrical proximity to the positive terminal 4a of the battery 4. The switch network 6 enables a flexible wiring of battery lines which are connected thereto, such as, for example, a starter-battery line 10 and/or a generator-battery line 8 and in particular a current disconnection in the event of an accident or a standstill.

It is possible to connect a load network, indicated schematically with a resistance 7, to the battery positive terminal 4a in parallel to the switch network 6. This load network 7 comprises, in particular, safety-critical components which must not be separated from the battery in any case.

The switch network 6 has an input 6a as well as a first output 6b and a second output 6c.

The input 6a is short-circuited with the battery positive terminal 4a. The first output 6b is connected to a generator-battery line 8. The second output 6c is connected to a starter-battery line 10. Both lines 8, 10 can be formed as flat cables or round cables, in particular as massive aluminium cables and/or copper cables. The generator-battery line 8 is connected directly to the generator 12. Furthermore, a further component network 14 can be provided to the leg of the generator-battery line 8. These components can, for example, be comfort components which must not necessarily be supplied with electrical power from the battery 4 in the event of a crash as well as during standstill of the vehicle. Furthermore, an external start support point 16 can be provided on the generator-battery line 8.

The starter-battery line 10, which is connected to the starter 18, is provided in parallel to the generator-battery line 8.

The starter-battery line 10 is preferably in two parts. A first part 10a is arranged between the output 6c of the switch network 6 and a first switch element 20. A second part 10b is arranged between the first switch element 20 and the starter 18. The starter-battery line 10 has a cross-sectional change in the region of the connection of the first switch element 20. The first part 10a can have a lower conductor cross-section than the second part 10b. A connection for the first switch element 20 can be guided from the starter-battery line 10 as a connector pin. The cross-sectional change can be arranged in the region of a firm connection between the two parts 10a and 10b. The two parts 10a, 10b can be formed from the same metal or from different metals. Therefore, the part 10b can, for example, have a higher conductivity than the part 10a. Preferably the two parts, however, are formed from copper, copper alloys, aluminium or aluminium alloys. In particular aluminium 99.5 or purer are suitable.

The ground return to the battery negative terminal 4b occurs in the shown case via the body, but can also occur via a separate ground line. In particular in high voltage systems, the ground return line occurs via a separate line.

Figure 2:
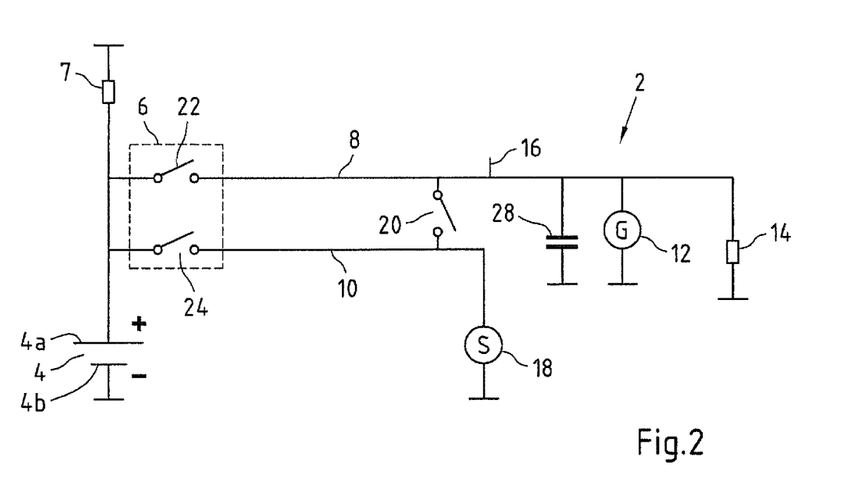
FIG. 2 a detailed electrical system topology having a switch network.

The switch network 6 has, as is depicted in FIG. 2, two switch elements 22 and 24 which connect the battery terminal 4a to either the line 8 or the line 10 respectively. The spatial separation between the switch network 6 and the switch element 20 is shown, due to which the line resistances between the starter 18 and the battery 4 or the generator 12 and the battery 4 can be varied. The switches 22, 24 of the switch network 6 can be encapsulated in a housing indicated by dashed lines.

The switch network 6 is preferably arranged in spatial proximity to the battery 4. The line length between the battery pole 4a and the switch network 6 must be selected to be as short as possible, preferably less than 50 cm. The switch element 20, on the other hand, is arranged in spatial proximity to the starter 18 and/or the generator 12.

The switch elements 20-24 can be formed as electric switches, for example as relays or contactors, and as semi-conductor switches. In particular, the switch elements 20-24 can be formed from parallel connections of semi-conductor switches.

A control circuit which is not depicted is provided in order to influence the switch states of the switch elements 20-24, in particular to open and to close these, and preferably to communicate with a control device present in the vehicle.

During standstill of a vehicle, the switch elements 22 and 24 can be opened. This means that the battery positive terminal 4a is separated electrically from the two lines 8, 10. The two lines 8, 10 are voltage-free and corrosion due to leakage current corrosion is prevented in these lines 8, 10 and in particular the respective contact points.

If the vehicle is to be started, at least the switch element 24 can be closed and the starter 18 is supplied with electrical power by the battery 4. The switch element 22 can therein likewise be closed. A voltage drop for the component 14 can be reduced by a back-up capacitor 28 at the moment of starting. It has, however, been shown that a support capacitor 28 can only limit a first voltage drop during the start procedure.

As a rule, however, the battery voltage falls several times below 9 volts without current limiting of the starter current such that the back-up capacitor 28 only helps in a limited manner. In order to enable the limiting of the start current, the switch element 20 is now provided. At the moment of starting, this switch element 20 is opened. Current flows from the battery to the starter 18 only via the reduced cross-section of the line 10. In the first start phase, the back-up capacitor 28 preferably ensures a voltage stabilisation of the component 14, in addition to the current limiting, via the starter line 10a with cross-sectional tapering. After the first start phase, the switch element 20 can be closed. Current flows from the battery 4 to the starter 18 both via the line 10 and via the line 8.

During operation, a charging current can flow from the generator 12 to the battery 4. Due to the switch element 20 it is possible to also use the line 10 during the charging procedure and therefore to reduce the power loss. Additionally, for an emergency operation, if one of the lines 8 or 10 is damaged, the respective defective line can be bridged via the switch element 20.

Due to a pulsed switching of the switch elements 20-24, in the case of starting it is also possible to vary the resistance and therefore to further limit the start switch-on current from the battery 4 to the starter 18.

An exemplary operation of the switch 20-24 is depicted in FIGS. 3a-3d.

FIGS. 3a-3d show the electrical system topology 2 according to FIG. 2 in operation. It can be recognised that the switch elements 20-24 are opened during the idle operation of the vehicle depicted in FIG. 3a. The switch elements 22, 24 separate the starter-battery line 10 and the generator-battery line 8 from the battery 4. The elements of the electrical system turned away from the battery 4 are all disconnected from current. Leakage current corrosion is therefore impossible.

Figure 3A:
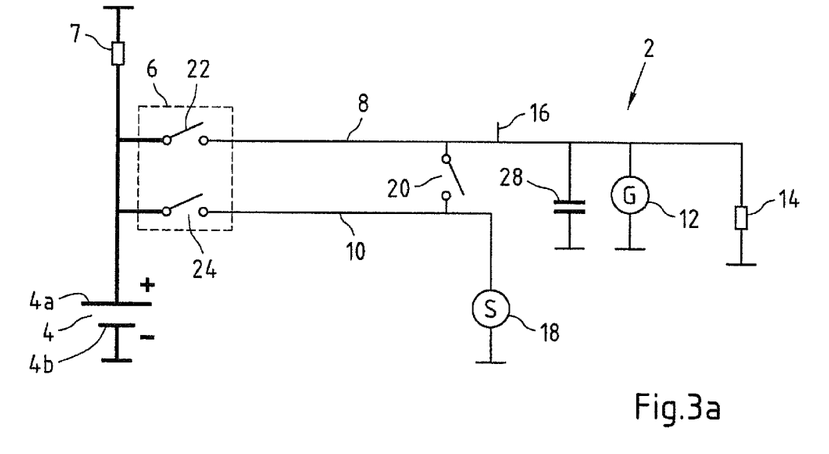
FIG. 3a a switch position in an idle position of the vehicle.
Figure 3B:
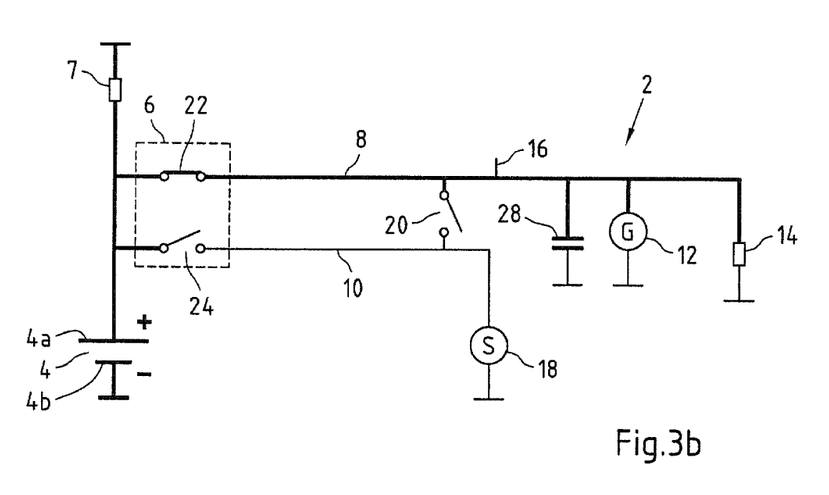
FIG. 3b a switch position in a prestart phase of the vehicle.

If a user wants to start the vehicle, he usually rotates the ignition key in the ignition lock or presses a start-stop button in the vehicle. At this moment, a prestart phase begins, as is depicted in FIG. 3b. In the prestart phase, the switch element 22 is closed at least temporarily. Here, in particular a pulsed operation of the switch element 22 is possible. Due to a suitable adjustment of the temporally averaged resistance of the switch element 22, it is possible to adjust the current flow between the battery 4 and the back-up capacitor 28. In particular it is useful in order to take care of the back-up capacitor 28 to design the current from the battery 4 to the support capacitor 28 to be ramp-shaped. Other current courses are also possible. In particular, the current course can be adapted by the preferably pulsed switch element 22 in such a way that the back-up capacitor 28 is charged. The charging current should, however, be measured such that the back-up capacitor 28 is stressed as little as possible. A pulse width modulation of the switching of the switch element 22 is therein advantageous. The prestart phase shown in FIG. 3b lasts as a rule a few hundred milliseconds. The support capacitor 28 is completely charged after the prestart phase.

Figure 3C:
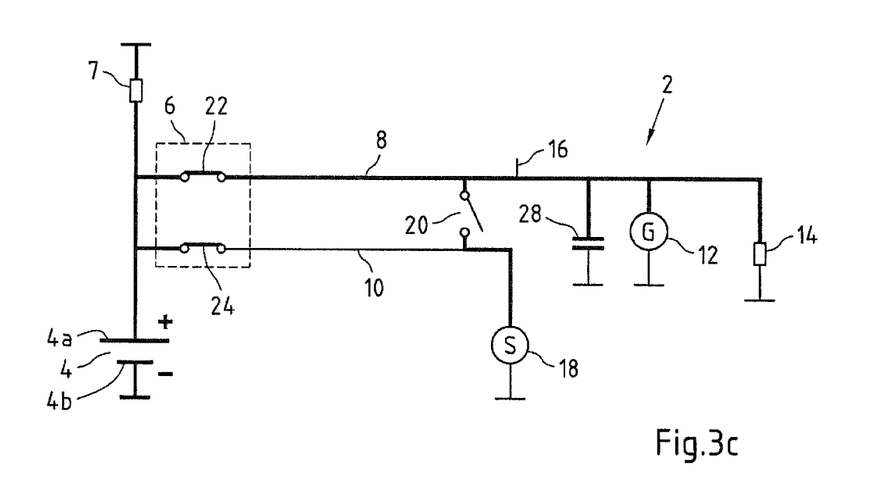
FIG. 3c a switch position in a first start phase of the vehicle.

Then a first start phase occurs, as is depicted in FIG. 3c. In FIG. 3c, it is recognised that in the first start phase, the switch elements 22 and 24 are closed, but the switch element 20 is opened. Due to the cross-sectional tapering in part 10a of the starter-battery line, only a limited current can flow from the battery 4 to the starter 18. The resistance in the starter-battery line 10 is increased compared to a conventional starter-battery line. In particular, the line cross-section is reduced in part 10a to approx. one third compared to a conventional conductor cross-section.

As can be recognised in FIG. 3c, the connection between the battery 4 and the generator 12 is closed. This occurs for the reason that the generator 12 already supplies a current in the first start phase. In particular the generator 12 is coupled mechanically to the starter 18. Due to the rotation of the starter 18 in the first start phase, the generator 12 already supplies energy which in turn can be used for starting. Additionally, electrical energy from the support capacitor 28 is used in order to supply the starter 18 with energy.

Figure 3D:
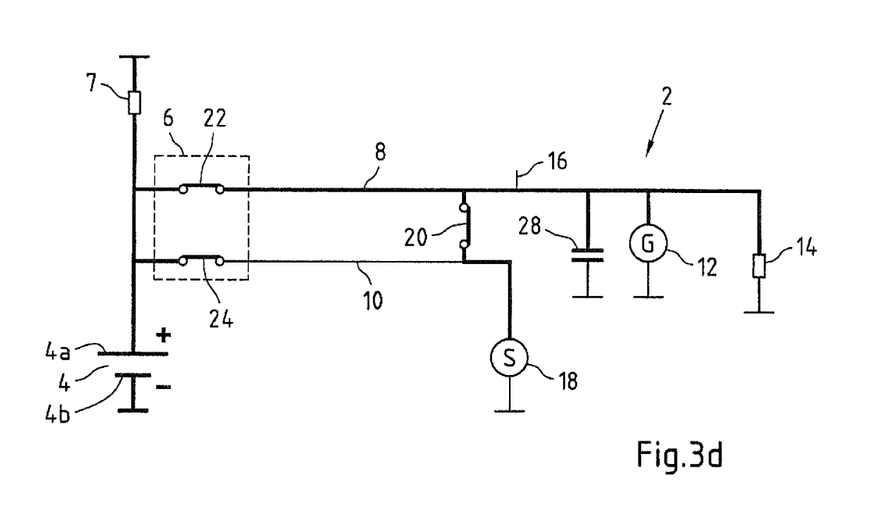
FIG. 3d a switch position in a second start phase of the vehicle.

After the first start phase which can last between 50 and 500 milliseconds, but can also be longer, the second start phase occurs which is depicted in FIG. 3d. In the second start phase, in addition to the switch elements 22, 24, the switch element 20 is also closed. The starter-battery line 10 is connected in parallel to the generator-battery line 8 between the battery 4 and the connection of the switch element 22. The total line resistance between the battery 4 and the connection of the switch element 20 is therefore reduced compared to the line resistance in the first start phase, as is shown in FIG. 3c. Current can flow from the battery 4 both via the starter-battery line 10 with cross-sectional tapering and in parallel via the generator-battery line 8. Additionally, a current can flow to the starter 18 directly from the generator 12 via the switch element 20.

Due to the cross-sectional tapering of the starter-battery line 10 in part 10a by approx. two thirds, it is possible to save weight. In particular, the additional weight due to the switch elements 20-24 is lower than the weight loss of the starter-battery line 10 achieved by the cross-sectional tapering.

The shown electrical system topology additionally represents a certain redundancy for the switch elements 22, 24. In the case of malfunction of one of the switch elements 22, 24, it is still possible to operate the vehicle in emergency operation by the switch element 20 remaining closed and the respective defective switch element 22 or 24 being bridged With the aid of the cross-sectional reduction it is possible to limit the start current and therefore to reduce or prevent the drop of the battery voltage. This leads to an increased convenience in the electrical system, in particular in the region of the component 7 and/or component 14.

The total ampacity and the switch power of the respective switch elements 20-24 can be reduced compared to the use of a single switch, as the switch power is distributed to three switch elements.

Finally, a better heat dissipation is possible due to the decentralised distribution of the switch elements 20 and 22, 24. The power loss in the switch element 20 is generated spatially at a different point to the power loss in the switch elements 22, 24.

Additionally, the line resistance during vehicle operation, as is shown in FIG. 3d, is reduced. In particular to charge the battery 4 during vehicle operation by the generator 12, besides the line cross-section of the generator-battery line 8, which would already be present, that of the part 10a of the starter-battery line 10 is also provided. Power loss is therefore reduced and the battery 4 can be charged better.

The control circuit which is not depicted also monitors the states of the switch elements 20-24. If, for example, the switch element 22 malfunctions, then a bridging of the switch element 22 is possible by closing the switch elements 20, 24. On the other hand it is also possible that a malfunction of the switch element 14 can be bridged by closing the switch elements 20, 22.

The invention claimed is:

1. Switch system for a motor vehicle electrical system comprising:
   a first switch element arranged between a generator-battery line and a starter-battery line of a vehicle electrical system, such that the generator-battery line and the starter-battery line can be short circuited spatially in a region of a starter, and wherein a first length of the starter battery line has a greater cross-section than a second length of the starter-battery line; and
   a switch network between the first switch element and a battery arranged electrically in parallel to the first switch element, wherein the switch network has a second switch element in the starter-battery line and a third switch element in the generator-battery line.

2. Switch system according to claim 1, wherein the first switch element is arranged in the region of an engine compartment of a motor vehicle.

3. Switch system according to claim 1, wherein the first switch element is connected at a cross-sectional tapering to the starter-battery line.

4. Switch system according to claim 3, wherein the cross-sectional tapering is such that the starter-battery line has a greater cross-section between the first switch element and the starter than the starter-battery line at least in parts between the first switch element and the battery and/or an output of the switch network.

5. Switch system according to claim 4, wherein the switch network is encapsulated in a housing and further comprising a multi-wired control line guided into the housing to switch the switch elements of the switch network.

6. Switch system according to claim 4, wherein the switch network is encapsulated in a housing and the housing is adapted to a pole niche of a vehicle battery.

7. Switch system according to claim 3, wherein the cross-sectional tapering causes at least a halving of the conductor cross-section, in particular a tapering from at least 85 mm$^2$ to at least 25 mm$^2$ of the conductor cross-section.

8. Switch system according to claim 1, wherein the first switch element is connected to the generator-battery line in such a way that the line length between the first switch element and the generator is less than between the first switch element and the battery and/or an output of the switch network.

9. Switch system according to claim 1, wherein the second and the third switch element are substantially able to be short-circuited with a battery positive terminal.

10. Switch system according to claim 1, wherein the switch network is encapsulated in a housing.

11. Switch system according to claim 1, wherein the switch elements are each able to be controlled separately.

12. System according to claim 1, wherein the switch network is arranged in spatial proximity to the battery, in particular at a distance of less than 50 cm, in particular that a line length between a battery terminal and the input amounts to less than 50 cm.

13. System according to claim 1, wherein the switch network is arranged in a battery tray or a current distributor.

14. System according to claim 1, wherein the switch network is arranged in a pole niche of the battery.

15. Switch system according to claim 1, wherein the first switch element has at least one electronic switch, in particular a semi-conductor switch, a transistor switch, a MOSFET switch, an IGBT switch or an electrical switch, in particular a relay or an antiserial switch.

16. Switch system according to claim 1, wherein at least one of the first, second or third switch elements is formed from a parallel connection of at least two switches which are able to be switched separately.

17. Switch system according to claim 1, wherein the third switch element is able to be switched in a pulsed manner.

18. Switch system according to claim 1, further comprising a control circuit connected to the switch elements, wherein the control circuit switches the switch elements depending on vehicle states.

19. Switch system according to claim 18, wherein the control circuit opens at least the second switch element, preferably the second switch element and the third switch element, in the case of vehicle standstill.

20. Switch system according to claim 18, wherein the control circuit initially only closes the second switch element and the third switch element during starting, preferably warm starting, of a combustion engine of the vehicle for a first start phase of less than 2 seconds, preferably less than 1 second, and additionally closes the first switch element after expiry of the first start phase.

21. System according to claim 18, wherein the control circuit monitors the state of the switch elements and, in the case of an error state of a switch element, bridges the faulty switch element electrically by switching at least one other respective switch element.

22. Switch system according to claim 1, wherein the generator-battery line is connected to a first part of electrical loads.

23. Switch system according to claim 22, wherein the battery is connected to a second part of electrical components in parallel to the switch network.

24. Method to control a switch system according to claim 1, the method comprising:
in the case of vehicle standstill, opening at least the second and/or the third switch element;
during warm starting of a combustion engine of the vehicle, initially closing only the second switch element and the third switch element for a first start phase of preferably less than 1 second; and
closing the first switch element after expiry of the first start phase.

25. Method according to claim 24, further comprising in the case of an error function of the second switch element, this is bridged by closing the first switch element and the third switch element, and that in the case of an error function of the third switch element, this is bridged by closing the first switch element and the second switch element.

26. Switch system according to claim 1, wherein the first switch element is connected to the starter-battery line in such a way that the line length between the first switch element and the starter is less than between the first switch element and the battery.

* * * * *